United States Patent
Sahoo et al.

(10) Patent No.: US 12,387,611 B2
(45) Date of Patent: Aug. 12, 2025

(54) SYSTEM AND METHOD FOR PLATFORM AGONISTIC FLIGHT MANAGEMENT DATA ACCESS

(71) Applicant: HONEYWELL INTERNATIONAL INC., Charlotte, NC (US)

(72) Inventors: Subhransu Sahoo, Bangalore (IN); Kalimulla Khan, Bangalore (IN); Raghu Shamasundar, Bangalore (IN); Kirupakar J, Madurai (IN); Robert Son, Phoenix, AZ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 199 days.

(21) Appl. No.: 17/937,550

(22) Filed: Oct. 3, 2022

(65) Prior Publication Data
US 2024/0021090 A1    Jan. 18, 2024

(30) Foreign Application Priority Data
Jul. 15, 2022 (IN) .............................. 202211040607

(51) Int. Cl.
| | | |
|---|---|---|
| G08G 5/34 | (2025.01) |
| G06F 9/445 | (2018.01) |
| G06F 16/11 | (2019.01) |
| G08G 5/20 | (2025.01) |

(52) U.S. Cl.
CPC ........... *G08G 5/34* (2025.01); *G06F 9/44505* (2013.01); *G06F 16/116* (2019.01); *G08G 5/20* (2025.01)

(58) Field of Classification Search
CPC ................ G08G 5/0039; G08G 5/0004; G06F 9/44505; G06F 16/116
See application file for complete search history.

(56) References Cited

U.S. PATENT DOCUMENTS

| | | | |
|---|---|---|---|
| 11,216,146 B2 * | 1/2022 | Cameron | G06F 3/0481 |
| 2012/0173052 A1 * | 7/2012 | Nicolas | G08G 5/34 |
| | | | 701/3 |

(Continued)

FOREIGN PATENT DOCUMENTS

EP    3483860 A1    5/2019

*Primary Examiner* — Thomas E Worden
*Assistant Examiner* — Madison B Emmett
(74) *Attorney, Agent, or Firm* — Ingrassia Fisher & Lorenz, LLP (57) ABSTRACT

Methods and systems for providing platform agnostic flight management data access for a flight management system (FMS) of an aircraft have been developed. First, a configuration file is loaded to a configuration database. The configuration file is for a data format of an external data source from the aircraft. Upon receiving a data access request from a user for external data from the external data source, downloading the configuration file is downloaded to an FMS data formatter. The configuration file is parsed with a data processor component of the FMS data formatter to update a rule set. The FMS data formatter receives an external data file from an application programing interface (API) of the external data source. The external data file is parsed with a rule engine of the FMS data formatter using the updated rule set. A flight plan file is generated with the FMS data formatter using the parsed external data file and sent to the FMS on the aircraft.

16 Claims, 6 Drawing Sheets

(56) References Cited

U.S. PATENT DOCUMENTS

| | | | |
|---|---|---|---|
| 2014/0075506 A1* | 3/2014 | Davis | H04B 7/18508 |
| | | | 726/3 |
| 2015/0339930 A1* | 11/2015 | McCann | G08G 5/32 |
| | | | 701/528 |
| 2017/0063995 A1 | 3/2017 | Gunn et al. | |
| 2017/0186328 A1 | 6/2017 | Beernaert | |
| 2017/0242910 A1 | 8/2017 | Hochwarth et al. | |
| 2018/0115609 A1 | 4/2018 | Dusik | |
| 2019/0311087 A1* | 10/2019 | Jackson | G06F 30/15 |
| 2020/0110621 A1* | 4/2020 | Sokomba | G01C 23/00 |
| 2020/0258398 A1 | 8/2020 | Shorter, Jr. et al. | |
| 2020/0314457 A1 | 10/2020 | Watson et al. | |
| 2020/0407075 A1 | 12/2020 | Toews et al. | |
| 2021/0327282 A1 | 10/2021 | Shamasundar et al. | |
| 2022/0085981 A1 | 3/2022 | Selvarajan et al. | |
| 2022/0166635 A1 | 5/2022 | Mohan et al. | |
| 2024/0208666 A1* | 6/2024 | Le Roux | G08G 5/0021 |
| 2025/0077600 A1* | 3/2025 | Brown | G06F 16/27 |

* cited by examiner

SYSTEM AND METHOD FOR PLATFORM AGONISTIC FLIGHT MANAGEMENT DATA ACCESS

CROSS-REFERENCE TO RELATED APPLICATION(S)

This application claims priority from Indian Provisional Patent Application No. 202211040607, titled "SYSTEM AND METHOD FOR PLATFORM AGONISTIC FLIGHT MANAGEMENT DATA ACCESS" that was filed Jul. 15, 2022.

TECHNICAL FIELD

The present invention generally relates to flight operations, and more particularly relates to a system and method for platform agnostic flight management data access.

BACKGROUND

Connectivity in the cockpit is gaining interest from original equipment manufacturers (OEMs) and aircraft operators. Typical needs of OEM's or operators include accessibility of mission critical parameters from avionics and mechanical systems to be able to upload mission information into flight management system (FMS) from an external application. Hence, there is a need for a system and method for platform agonistic flight management data access.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for method for providing platform agnostic flight management data access for a flight management system (FMS) of an aircraft. The method comprises: loading a configuration file to a configuration database, where the configuration file is for a data format of an external data source from the aircraft; downloading the configuration file to an FMS data formatter upon receiving a data access request for external data from the external data source, where the data access request is from a user of the FMS of the aircraft; parsing the configuration file to update a rule set with a data processor component of the FMS data formatter; receiving an external data file from an application programing interface (API) of the external data source with the FMS data formatter; parsing the external data file with a rule engine of the FMS data formatter, where the rule engine uses the updated rule set; generating a flight plan file with the FMS data formatter using the parsed external data file; and sending the flight data plan file to the FMS on the aircraft with an FMS data engine.

A system is provided for providing platform agnostic flight management data access for a flight management system (FMS) of an aircraft. The system comprises: a business services support (BSS) module that determines a user's allowed access via and identity/access management (IAM) component; an FMS data formatter that includes a rule-based engine module that receives a file request for the user, where the rules-based engine module handles input/output (I/O) processing of supporting file formats via a retrieved configuration file for the file formats; and a context processing engine moderates an I/O task flow based on a present state of the FMS.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present system defines a standardized mechanism to offer connectivity to a flight management system (FMS) using a standardized architecture to send and receive information that is client and platform agnostic. The platform data exchange variations (formats, ranges, etc.) are handled by configuration ("config") files or similar templates. System input/output (I/O) functions use a generic rule-base engine for processing supporting formats. The I/O is moderated based on the situation or state of the FMS with a context processing engine. Secure access to FMS data is assured via identity and licensed-based access management.

An FMS is the primary medium to provide connectivity in avionics owing to the fact that it integrates several avionics systems and it is the primary interface for mission inputs as well as performing mission critical computations. With more and more users increasing system connectivity, it is important for FMS to have a common architecture and strategy to address this growing need in a way which is secure and eliminates the need to develop specialized solutions for each user.

More specifically, the FMS is a specialized computer that automates a variety of in-flight tasks such as in-flight management of the flight plan. Using various sensors such as global positioning system (GPS), the FMS determines the aircraft's position and guides the aircraft along its flight plan using its navigation database. From the cockpit, the FMS is normally controlled through a visual display device such as a control display unit (CDU) which incorporates a small screen, a keyboard or a touchscreen. The FMS displays the flight plan and other critical flight data to the aircrew during operation.

The FMS may have a built-in electronic memory system that contains a navigation database. The navigation database contains elements used for constructing a flight plan. In some embodiments, the navigation database may be separate from the FMS and located onboard the aircraft while in other embodiments the navigation database may be located on the ground and relevant data provided to the FMS via a communications link with a ground station. The navigation database used by the FMS may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS to modify the plight flight plan before takeoff or even while in flight for variety of reasons. Such changes may be entered via the CDU. Once in flight, the principal task of the FMS is to accurately monitor the aircraft's position. This may use a GPS, a VHF omnidirectional range (VOR) system, or other similar sensor in order to determine and validate the aircraft's exact position. The FMS constantly cross checks among various sensors to determine the aircraft's position with accuracy.

Additionally, the FMS may be used to perform advanced vertical navigation (VNAV) functions. The purpose of VNAV is to predict and optimize the vertical path of the aircraft. The FMS provides guidance that includes control of the pitch axis and of the throttle of the aircraft. In order to accomplish these tasks, the FMS has detailed flight and engine model data of the aircraft. Using this information, the FMS may build a predicted vertical descent path for the aircraft. A correct and accurate implementation of VNAV has significant advantages in fuel savings and on-time efficiency.

Figure 1:
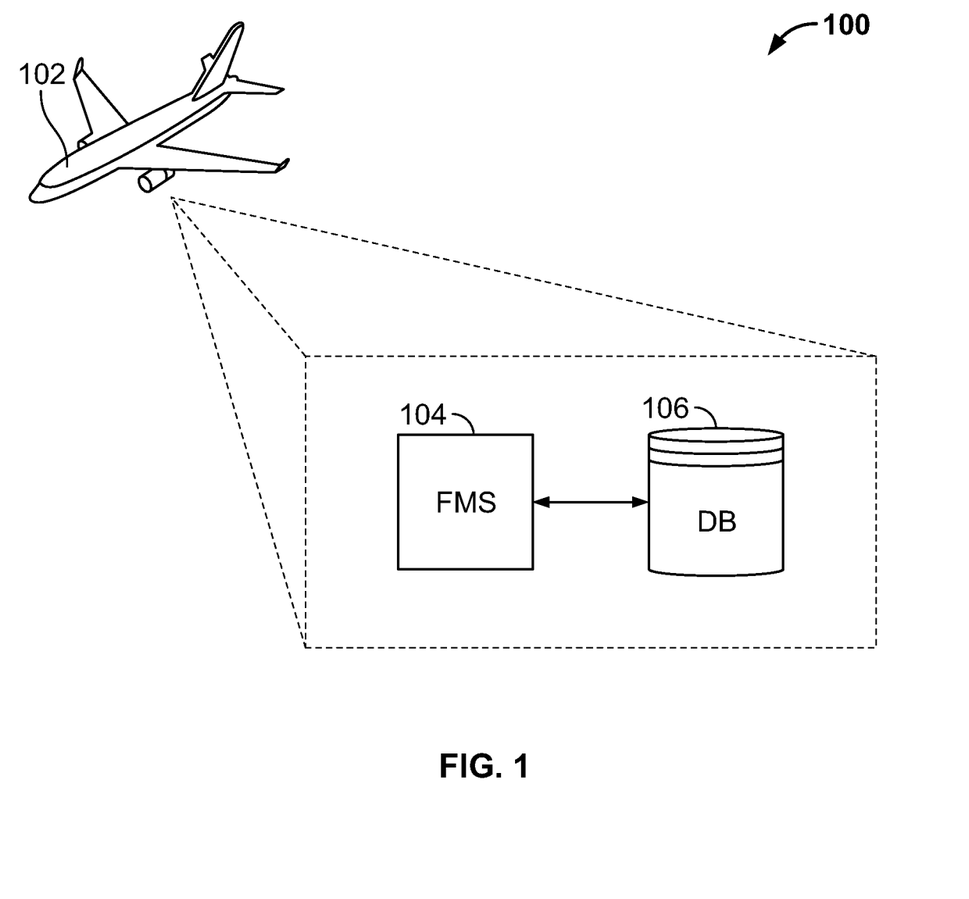
FIG. 1, shows a diagram of an in-flight aircraft that contains an onboard FMS along with a database that is accessed by the FMS in accordance with one embodiment.

Turning now to FIG. 1, a diagram 100 is shown of an in-flight aircraft 102 that contains an onboard FMS 104 along with a database 106 that is accessed by the FMS 104 in accordance with one embodiment. In alternative embodiments, the database 106 may be integrated as part of the FMS 104. In still other embodiments, the database 106 may be located off board the aircraft on the ground and connected to the FMS 104 via a communications data link. In some embodiments, the database 106 may include a navigation database as well as performance characteristics database of the aircraft 102 for retrieval and use by the FMS 104.

As mentioned, the present system and method utilize a standardized architecture to send and receive information that is client and platform agnostic. The user/platform data exchange variations (e.g., formats, ranges) are handled by configuration files and/or system templates. A rule-based engine for handles I/O processing of supporting formats while a context processing engine moderates I/O based on the state of the FMS. Secure access to FMS data is controlled via identity and/or access management. Access may also have license-based restrictions.

Data usage patterns are stored for analytics on performance, monitoring usage and monetization. Data is increasingly becoming the most valuable information across product systems. The provider of the FMS data typically owns and/or control over who accesses the data and benefits from the same with respect to multiple avenues to monetize FMS data.

Various monetization actions may include like "data as a service" or various specialized application suites. With OEM's and users coming up with new requests for data access across platforms, it is advantageous to offer a standardized mechanism that enables controlled access which can be monetized. The present proposed architecture enables users retaining control over the data flow in a seamless manner.

Figure 2:
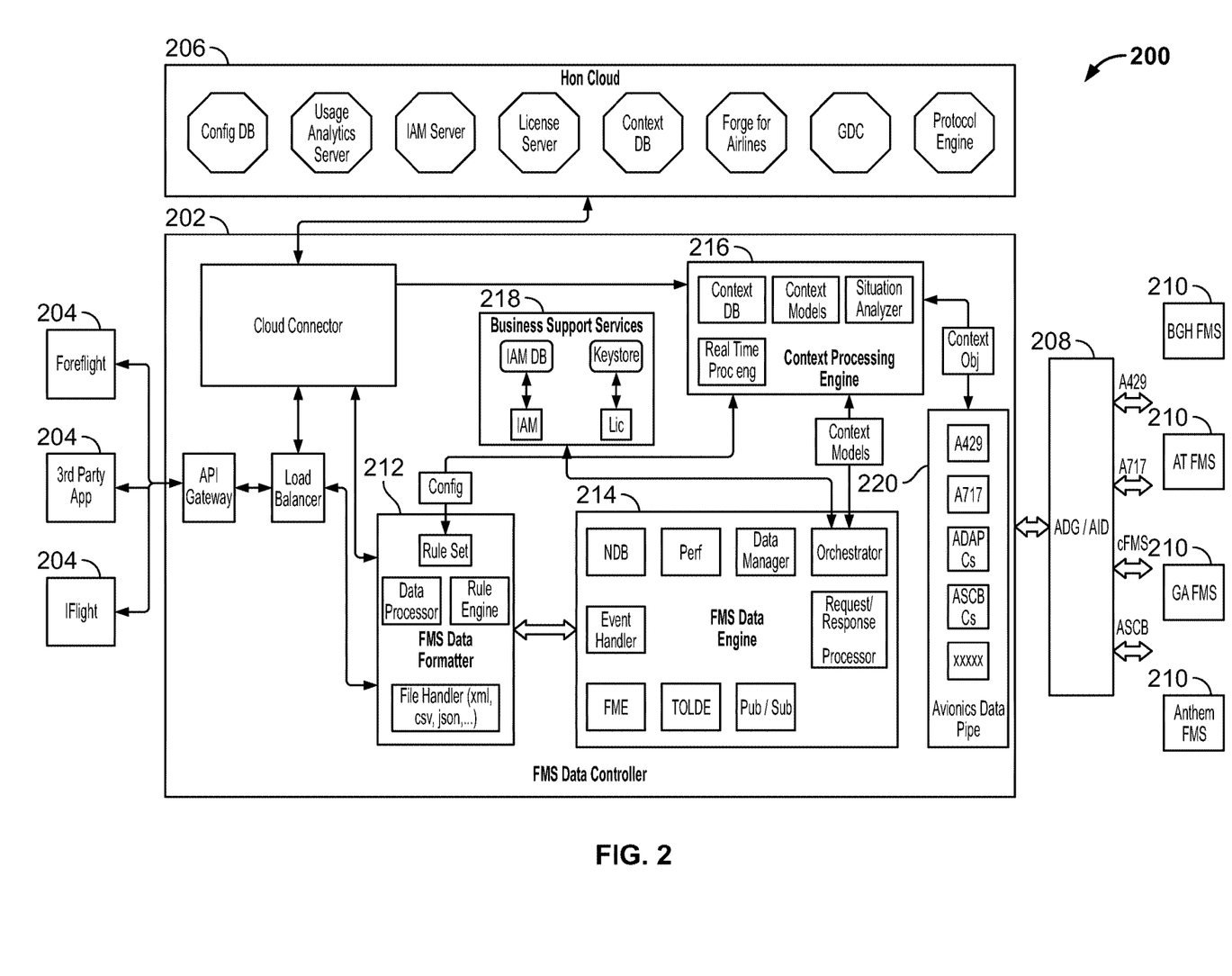
FIG. 2 shows a diagram of a system that provides platform agnostic flight management data access in accordance with one embodiment.

Turning now to FIG. 2, a diagram is shown of a system 200 that provides platform agnostic flight management data access in accordance with one embodiment. Specifically, the diagram depicts the internal system architecture of an FMS Data Controller 202 which exchanges data between various offboard applications 204 and the various FMS systems 210 as well as accesses various cloud databases 206. Major components of the FMS Data Controller include: an FMS Data Formatter 212; an FMS Data Engine 214; a Context Processing Engine 216; and a Business Support Services Module 218.

The FMS Data Formatter 212 receives and exchanges data with offboard applications 204 via an Application Program Interface (API) Gateway and Load Balancer. The FMS Data Formatter 212 also accesses cloud-based resources including various databases and servers via a cloud connector. The FMS Data Formatter 212 includes: a data processor; a rule engine and a file handler which handles files in formats such as .xml, .csv, .json, etc. The Data Formatter 212 also receives a rule set for the rule engine that is provided by the Context Processing Engine 216.

The Context Processing Engine 216 includes: a situation analyzer; a real time processing engine; a context database; and context models. The Context Processing Engine 216 accesses cloud-based resources including various databases and servers via a cloud connector. The Context Processing Engine 216 creates and provides the configuration file ("config.") to the FMS Data Formatter 212 and also creates and provides context objects ("Context Obj") to both the FMS Data Engine and the Avionics Data Pipe 220. The context objects represent the real time state of the FMS of the aircraft.

The Business Support Services Module 218 controls identity and access management ("IAM") for authentication of users as well as verifying license authorization ("Lic") for data access. The Business Support Services Module 218 includes: an IAM database; and a Keystore memory for license keys. The Business Support Services Module 218 accesses cloud-based resources including various databases and servers via a cloud connector.

The FMS Data Engine 214 receives formatted data from the FMS Data Formatter 212 and the related context objects from the Context Processing Engine 216 and provides the processed data stream to the appropriate FMS 210 via the avionics data pipe 220 and the Aircraft Data Gateway/ Aircraft Interface Device (ADG/AID) 208. The FMS Data Engine 214 includes the following components: event handler; Flight Management Engine (FME); Take Off and Landing Engine (TOLDE); Pub/Sub; Request/Response Processor; Orchestrator; Data Manager; Performance Calculations (Perf); and Navigation Database (NDB).

Figure 3:
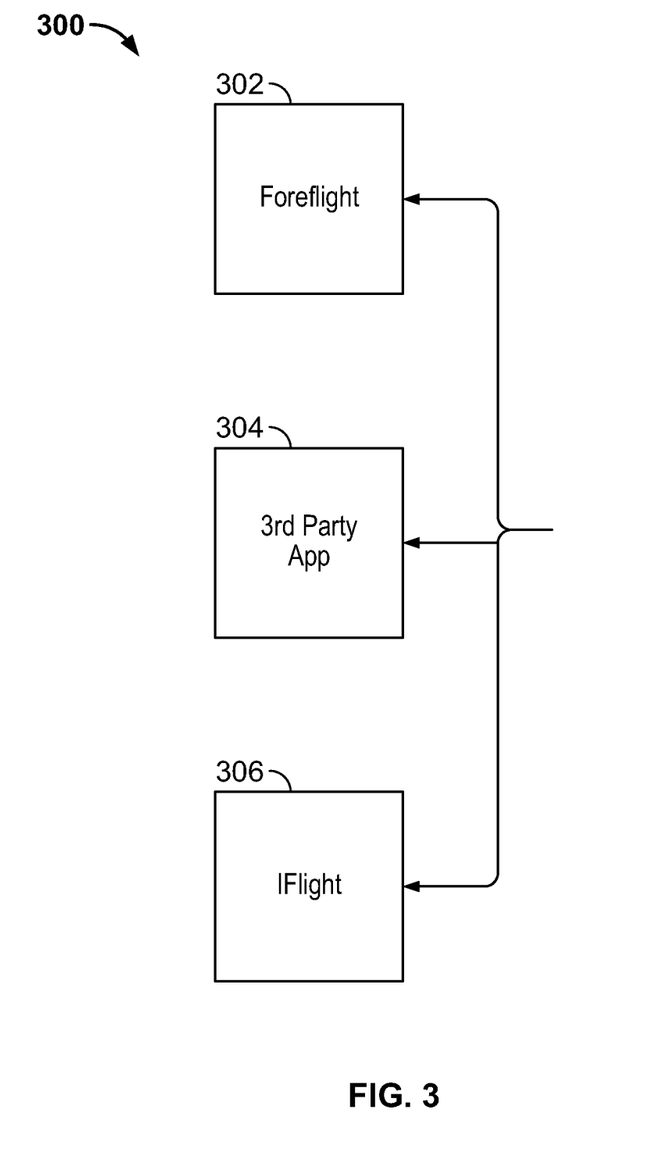
FIG. 3 shows a detailed diagram of application program interface (API) gateways with reference to the diagram of the system shown in FIG. 2.
Figure 4:
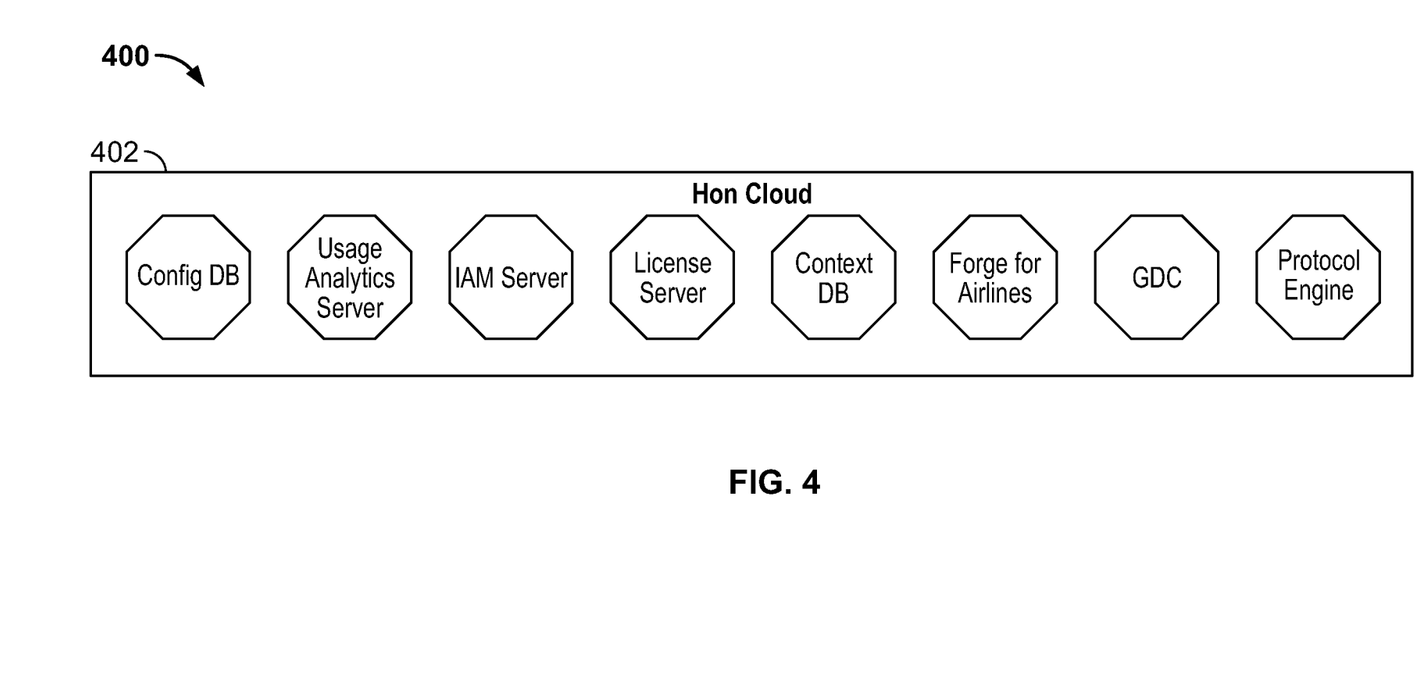
FIG. 4 shows a detailed diagram of cloud databases with reference to the diagram of the system shown in FIG. 2.
Figure 5:
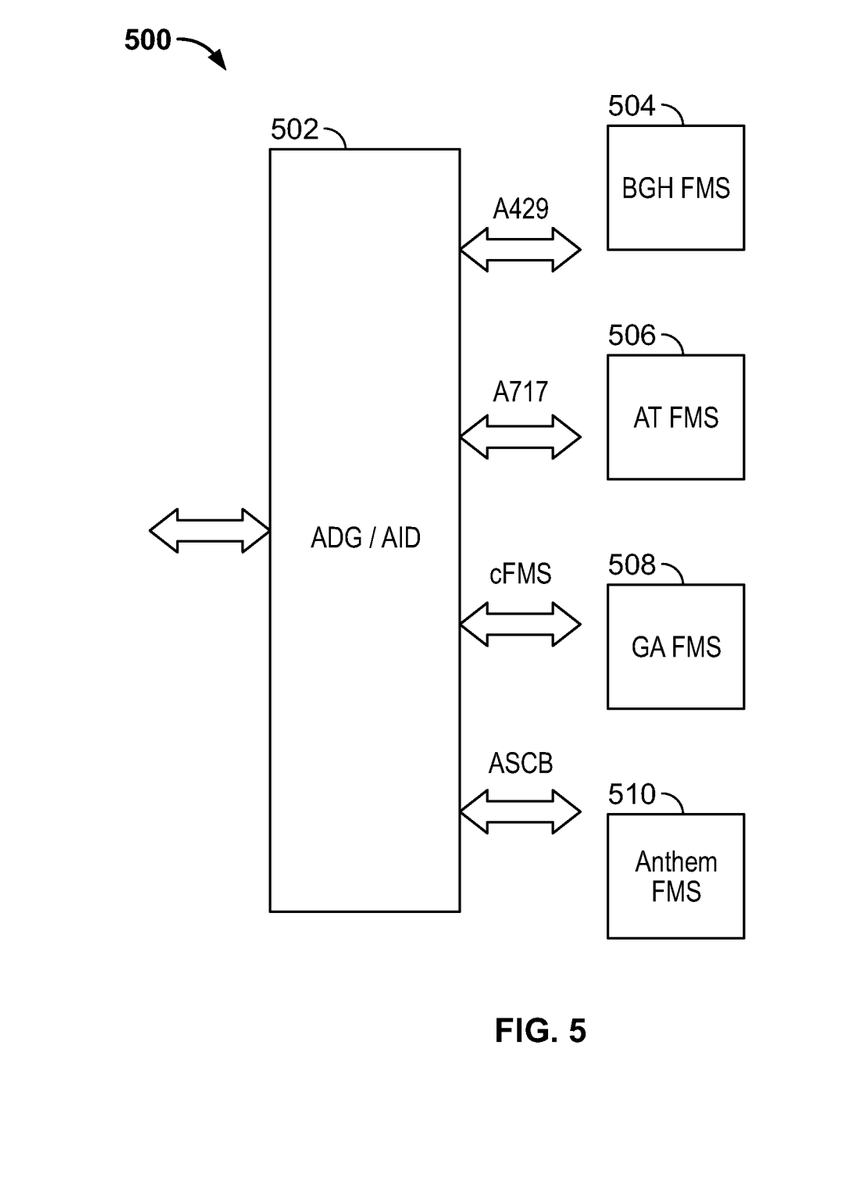
FIG. 5 shows a detailed diagram of inputs/outputs for FMSs with reference to the diagram of the system shown in FIG. 2.

Turning now to FIG. 3, a detailed diagram 300 is shown of application program interface (API) for offboard applications with reference to the diagram of the systems 204 shown previously in FIG. 2. The APIs include various third party applications 302, 304 and 306. The APIs and connected to the FMS Data Formatter 212 via an API Gateway and Load Balancer. Turning now to FIG. 4, a detailed diagram 400 is shown of cloud databases, servers and other cloud-based resources 402 with reference to the cloud infrastructure 206 of the system shown previously in FIG. 2. The cloud-based components include: Configuration Database; Context Database; Protocol Engine; IAM Server; Usage and Analytics Server; License Server; Forge for Airlines; and Go Direct Connect (GDC). The cloud-based resources 402 provide access to the FMS Data Formatter 212; the Context Processing Engine 216, and the Business Support Services Module 218 via a cloud connector. Turning now to FIG. 5, a detailed diagram 500 is shown of inputs/outputs (I/O) for FMSs with reference to the system 502-510 shown in FIG. 2. The ADG/AID 502 receives the data from the Avionics Data Pipe 220 and passes it on the appropriate FMS such as a Business Jet and Helicopter (BGH) FMS, an Air Transport (AT) FMS, a General Aviation (GA) FMS and an Anthem FMS where it is displayed to a user.

Figure 6:
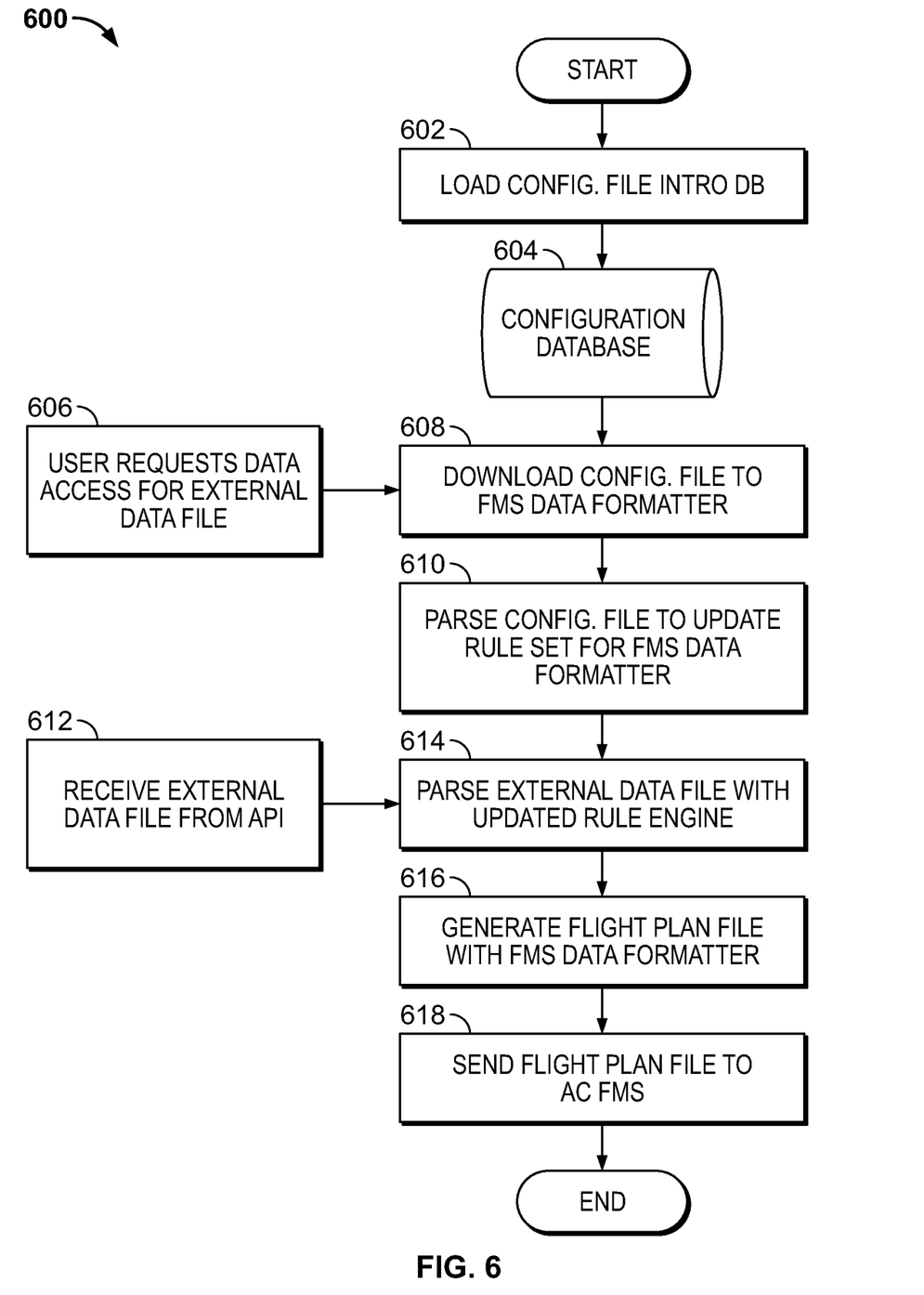
FIG. 6 shows a flowchart depicting a method for platform agonistic flight management data access.

Turing now to FIG. 6, a flowchart 600 is shown depicting a method for platform agonistic flight management data access. First, a configuration file is loaded 602 to a configuration database 604. The configuration file is for a data format of an external data source from the aircraft. Upon receiving a data access request from a user for external data from the external data source 606, the configuration file is downloaded to an FMS data formatter 608. The configuration file is parsed with a data processor component of the FMS data formatter to update a rule set 610. The FMS data formatter receives an external data file from an application programing interface (API) of the external data source 612. The external data file is parsed with a rule engine of the FMS data formatter using the updated rule set 614. A flight plan file is generated with the FMS data formatter using the parsed external data file 616 and sent to the FMS on the aircraft 618.

The advantage of the present embodiments allows for system to send and receive information to an FMS that is client and platform agnostic. Configuration files and Templates handle client and platform variations in data (e.g., formats, ranges, etc.). A Generic Rule Based Engine for I/O processing of supporting formats of data. The Context Processing Engine moderates the I/O based on situation or state of the FMS. Additionally, secure access and license verification is controlled by the Business Support Services Module. Finally, data usage patterns are monitored and saved for analytics on performance, and monetization.

During an exemplary operation, the respective format config file will be uploaded to Config DB residing in the cloud. Next, the user will have their identity and license verified and authorized by the IAM and license component of the Business Support Services Module. Upon authorization of the user, the load balancer will send the data request to FMS Data Formatter. The FMS Data formatter will download the respective config file from Config DB residing in Cloud using Context Processing Engine and Cloud Connector. The data processor component of the FMS Data Formatter updates the rule set by parsing the config file. The input data file will then be parsed using rule engine with updated rule set. The file handler of the FMS Data Formatter will encode the parsed data and generate a flight plan file (.SFP) using rule engine. The generated flight plan File will be sent to AW139 gateway using Request/Response processor of FMS Data Engine using the Avionic Data Pipe. The FMS of AW139 will retrieve the data from gateway connected to the AW139 aircraft.

In one example of operation, a user wants to upload a flight plan (in format .HFP) to an AW139 (in format .SFP) aircraft. The system will upload the respective format config file to the config file database (DB) residing in the Cloud. The user will be authenticated and authorized by and identity and access management (IAM) component of the business support services (BSS) module. Upon authorization of the user, the load balancer will send the access request to FMS data formatter. The FMS data formatter will then download the respective config file from config file DB residing in the Cloud using context processing engine and via the cloud connector. The data processor of FMS data formatter will then update the rule set by parsing the config file. The input file is parsed using rule engine with updated rule set. The file handler encodes the parsed data and generate the flight plan file (.SFP) using rule engine. The generated flight plan File is sent to AW139 gateway using request/response processor of FMS data engine using the avionic data pipe. The FMS of the AW139 will retrieve the data from gateway connected to AW139 aircraft.

In another example of operation, a user wants to upload required aircraft state data. Upon a user request, the system will upload the respective format config file to the config DB residing in the Cloud. The user will get authenticated and authorized by IAM component of BSS module. Upon authorization, of the user will send request for aircraft state data to the load balancer. The load balancer will send the request to FMS data formatter to format the request as per aircraft type. The FMS Data formatter will download the respective config file from config DB residing in the Cloud using the context processing engine via the cloud connector. The formatted request will be sent to the FMS through the request/response processor of the FMS data engine and the avionic data pipe. The FMS collects and transmits the aircraft state response data to request/response processor through the gateway and the avionics data pipe based on user need. The data processor of FMS data formatter will update the rule set by parsing the config file. The aircraft state response from FMS will be parsed using rule engine with updated rule set. The file handler will encode the parsed data and generate the aircraft state response as per user need using rule engine. The formatted aircraft State response will be sent to the user's application.

In another example operation, a user wants to upload a flight plan (in I/O format .XML) to an FMS (in format .HFP). Upon a user request, the system uploads the system will upload the respective format config file to the config DB residing in the Cloud. The user is authenticated and authorized by IAM component of BSS module using a third party application. Upon authorization of the user, the load balancer sends the request to FMS data formatter. The FMS data formatter downloads the respective config file from the config DB residing in the Cloud using context processing engine via the cloud connector. The data processor of FMS data formatter updates the rule set by parsing the config file. The input file will be parsed using the rule engine with the updated rule set. The file handler will encode the parsed data and generate the flight plan file (.HFP) using the rule engine. The generated flight plan file is sent to the aircraft gateway having the FMS 7.1 format using the request/response processor of the FMS data engine using the avionic data path. The FMS retrieves the flight plan file from gateway connected in aircraft having FMS 7.1 format.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

What is claimed is:

1. A method for providing platform agnostic flight management data access for a flight management system (FMS) of an aircraft, comprising:
    loading a configuration file into a configuration database, where the configuration file is for a data format of an external data source from the aircraft;
    downloading the configuration file to an FMS data formatter upon receiving a data access request for external data from the external data source, where the data access request is from a user of the FMS of the aircraft;
    parsing the configuration file to update a rule set with a data processor component of the FMS data formatter;
    receiving an external data file from an application programing interface (API) of the external data source with the FMS data formatter;
    parsing the external data file with a rule engine of the FMS data formatter, where the rule engine uses the updated rule set;
    generating a flight plan file with the FMS data formatter using the parsed external data file; and
    sending the flight data plan file to the FMS on the aircraft with an FMS data engine.

2. The method of claim 1, where the configuration database is cloud based.

3. The method of claim 2, where the external data source is a third party data source.

4. The method of claim 3, where the third party data source uses a different data format than the FMS of the aircraft.

5. The method of claim 2, where the external data file is passed from the API of the external data source to the FMS data formatter through an API gateway and load balancer.

6. The method of claim 2, further comprising:
    loading a context model file into a context database;
    downloading the context model file to a context processing engine upon receiving the data access request for external data from the external data source;
    determining a state of the FMS of the aircraft with the context engine;

creating a context object with the context processing engine, where the context object represents the state of the FMS of the aircraft; and moderating the flight plan file based on the state of the FMS of the aircraft.

7. The method of claim 6, where the context database is cloud based.

8. The method of claim 6, where context processing engine determines the state of the FMS using context models, a situation analyzer and a real time processing engine.

9. A system for providing platform agnostic flight management data access for a flight management system (FMS) of an aircraft, comprising:

a business services support (BSS) module that determines a user's allowed access via an identity/access management (IAM) component;

a context processing engine that moderates an input/output (I/O) task flow based on a present state of the FMS;

an FMS data formatter that,
downloads a configuration file from the context processing engine upon receiving a data access request for external data from the external data source, where the data access request is from a user of the FMS of the aircraft,
parses the configuration file to update a rule set with a data processor component of the FMS data formatter,
receives an external data file from an application programing interface (API) of the external data source,
parses the external data file with a rule engine of the FMS data formatter, where the rule engine uses the updated rule set,
generates a flight plan file using the parsed external data file, and an FMS data engine that sends the flight data plan file to the FMS on the aircraft.

10. The system of claim 9, where the configuration file is stored on a cloud base configuration database.

11. The system of claim 9, where the external data source is a third party data source.

12. The system of claim 11, where the third party data source uses a different data format than the FMS of the aircraft.

13. The system of claim 9, where the external data file is passed from the API of the external data source to the FMS data formatter through an API gateway and load balancer.

14. The system of claim 9, where the context processing engine,:

downloads a context model file from a context database;
downloads the context model file to a context processing engine upon receiving the data access request for external data from the external data source;
determines the state of the FMS of the aircraft with the context engine;
creates a context object with the context processing engine, where the context object represents the state of the FMS of the aircraft; and
moderates the flight plan file based on the state of the FMS of the aircraft.

15. The system of claim 14, where the context database is cloud based.

16. The system of claim 14, where context processing engine determines the state of the FMS using context models, a situation analyzer and a real time processing engine.

* * * * *